C. FALK.
CUTTER BAR FOR MOWING MACHINES.
APPLICATION FILED OCT. 24, 1911.
1,032,195.
Patented July 9, 1912.
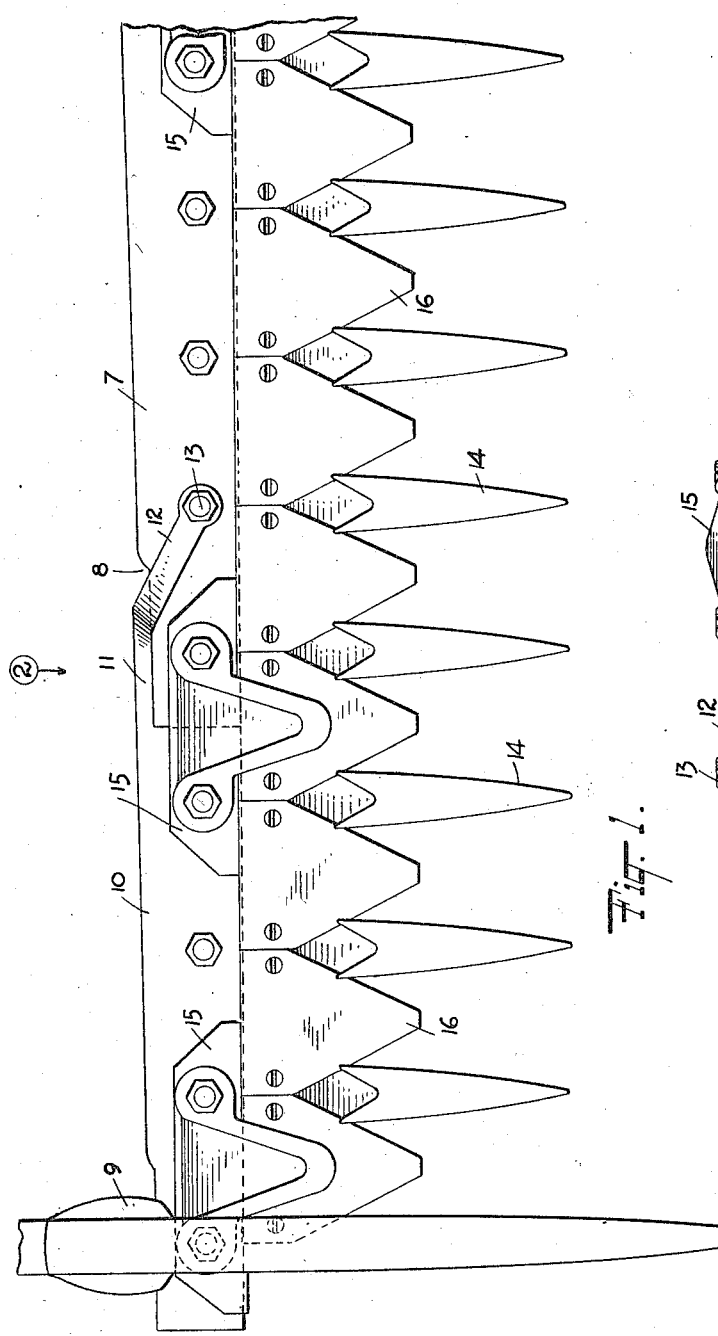
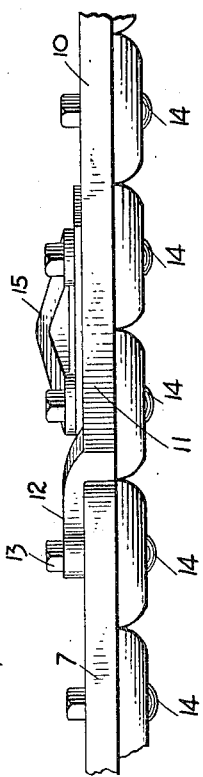
WITNESSES
INVENTOR
Carl Falk
BY
ATTORNEYS

UNITED STATES PATENT OFFICE.

CARL FALK, OF ST. PAUL, NEBRASKA.

CUTTER-BAR FOR MOWING-MACHINES.

1,032,195. Specification of Letters Patent. Patented July 9, 1912.

Application filed October 24, 1911. Serial No. 656,357.

*To all whom it may concern:*

Be it known that I, CARL FALK, a citizen of the United States, and a resident of St. Paul, in the county of Howard and State of Nebraska, have invented a new and Improved Cutter-Bar for Mowing-Machines, of which the following is a full, clear, and exact description.

Among the principal objects which the present invention has in view are: to provide a removable extension for the cutter bar to augment the cutting cacapity of a mowing machine; and to provide means for splicing the extension and main frame of the cutter bar which is simple, economical and efficient.

One embodiment of the present invention is disclosed in the structure illustrated in the accompanying drawings, in which like characters of reference denote corresponding parts in both views, and in which—

Figure 1 is a plan view of the outer fragment of a cutter bar, shown in conjunction with an extension constructed and arranged in accordance with the present invention; and Fig. 2 is a rear edge view of fragments of the main cutter bar and extension, the view being taken as indicated by the arrow 2 in Fig. 1.

The main finger 7 is contracted at the outer edge to form a recess 8. The recess 8 supports in its operative position the shoe 9. The cutter bar extension 10 utilizes the recess 8 by extending the portion 11 of the brace bar 12 into the said recess to rest against the rear wall of the main finger bar 7, as seen best in Fig. 2 of the drawings. The brace bar 12 is reduced in thickness and secured to the main cutter bar by means of a bolt 13 passed through one of the perforations provided for the fastening bolts for the guards 14 with which the finger bar 7 and extension 10 are provided.

When the extension 10 is to be added to the main finger bar 7, the shoe 9 is preliminarily removed from the finger bar 7. The extension 10 is then spliced or adjusted to the main bar, the portion 11 and brace bar 12 being adjusted and secured as above described. The square shoulders formed in the end of the finger bar 7 and the extension 10 are held in position by one of the guide plates 15, wearing plate and knife holder usually provided to hold in position the knife bar of the cutter bar by bearing on one of the blades 16. The guide plate 15, wearing plate and knife holders which are utilized to splice the joint, engage the perforation in the extension 10 adjacent the inner end thereof and the perforation formed in the outer end of the finger bar 7 usually provided for the securement of the shoe 9.

It will be understood that the above described construction forms a solid and rigid joint of the extension 10 with the main finger bar 7.

By employing a construction of the character described provision is made for rapidly and conveniently extending the cut of the mowing machine provided with the cutter finger bar 7. Also, after the need of the lengthened cut no longer exists the extension 10 may be readily and quickly removed from the finger bar 7, this removal requiring only that the wearing plate and knife holder 15 and the brace bolt 13 be released from their fastenings; and that the shoe 9 be shifted from the outer end of the extension 10 for adjustment upon the outer end of the finger bar 7. It is also understood that the mowing machine will be provided with long and with short knives, or sickles, for use with cutting bars of different lengths.

Having thus described my invention, what I claim as new and desire to secure by Letters Patent is:—

In a finger bar of the character set forth, the combination with a main bar having a recessed outer end, of an extension shaped to conform in cross section to the said bar and having a recess in the outer end thereof shaped to conform with the recess in said bar; a brace bar integrally formed on said extension at the inner end thereof to override the said main bar to the forward edge thereof having a portion resting in the recess at the rear of said main bar; a splicing plate disposed adjacent the forward edge of said main bar and extension; and fastening devices for securing said brace bar and splicing plate in position.

In testimony whereof I have signed my name to this specification in the presence of two subscribing witnesses.

CARL FALK.

Witnesses:
PAUL ANDERSON,
GEO. E. LAWN.

Copies of this patent may be obtained for five cents each, by addressing the "Commissioner of Patents, Washington, D. C."